Patented Feb. 10, 1931

1,792,254

UNITED STATES PATENT OFFICE

FREDERIC H. SMYSER, OF MARBLEHEAD, MASSACHUSETTS, ASSIGNOR TO GENERAL ELECTRIC COMPANY, A CORPORATION OF NEW YORK

CELLULOSE COMPOSITION AND PROCESS OF MAKING MOLDED PRODUCTS THEREFROM

No Drawing. Application filed October 22, 1929. Serial No. 401,627.

My invention relates to a new process for treating comminuted cellulosic material to produce a molded product and to the new product produced thereby which possesses characteristics of quality which render it peculiarly suitable for electrical insulating material or for other purposes for which a hard, infusible compound may be employed.

As a consequence of my invention waste cellulosic products such as bagasse, sawdust, cornstalks, and the like, may be converted into useful molded compositions by a simple, inexpensive process.

Although the novel features of my invention will be set forth with greater particularity in the appended claims it can be stated briefly to comprise the steps of digesting the comminuted cellulose products with a reagent having alkaline properties, thereafter neutralizing and acidifying the digested mass, thereby liberating resinous products from solution and precipitating the same upon the cellulose fibres, and finally, after removing soluble by-products, molding the product in admixture with a substance adapted to produce a hard, insoluble product and to prevent the evolution of gases during molding. A dense, homogeneous, inert material results as the product of my invention.

In order to illustrate my invention, I cite as examples the preparation of molded products of the type described from sawdust and bagasse, although it is to be understood that cornstalks or any other suitable cellulosic material may be employed.

Sawdust (or bagasse) _____ 6 lbs.
Sodium hydroxide_____ 2 lbs.
Water_____ 1 gallon are placed in a steel digester or autoclave and treated with steam at about 160 lbs. pressure for 3 to 4 hours and then removed. About 3½ lbs. of concentrated sulfuric acid in 3 to 4 gallons of water are now added. The acid precipitates resinuous products presumably by decomposition of resinates of alkali metal formed during the digesting process. The mass is filtered and washed, the washing being continued until the filtrate is neutral and free from sulfate.

After drying in the air at about 80° C., an alkaline substance is added and the product thoroughly mixed in a ball mill or tumbling barrel, or otherwise to form a powdered compound ready for molding. In the case of sawdust about 30% of hydrated lime by weight may be added. In the case of bagasse I prefer to add a lesser amount, say 10% of hydrated lime. Hydrated barium or strontium oxide may be used. This compound is placed in molds and subjected to heat and pressure. A pressure of about 3000 pounds per square inch and a temperature of 150° C. to 160° C. are usually employed. Under these conditions certain constituents of the mixture become plastic and the material flows taking the exact shape of the mold. At the same time, chemical changes take place so that in a short time, usually in a few minutes, the mass becomes hard and infusible. The molded article may be removed from the mold while hot without distortion.

Such molded articles are hard and strong, possess a high dielectric strength and smooth finish, and are little or not at all affected by atmospheric moisture. Resistance to moisture may be improved by heating the molded articles to about 150° C. for several hours after removal from the molds, by finer grinding preliminary to molding, or by adding small quantities of resins. If it is desirable to reduce the bulk of the powder to facilitate filling certain types of molds, it may be mixed on hot differential rolls or preformed into pills in the usual manner.

By digesting or heating in the presence of steam with an alkali, such as caustic soda, the resinous binding substances are dissolved and the cellulose fibres separated in much the same manner as in the preparation of paper pulp, with the difference that whereas in the preparation of paper pulp the object is to obtain the greatest possible yield of fibre, in my process the products desired are substances capable of reacting to form moldable compounds. I therefore prefer to use somewhat different conditions, such as a greater proportion of alkali, and higher temperatures, than are customary in the pulp industry, I thus obtain not only a more complete action on the noncelluloseic constituents but also probably a certain degree of hydration of the cellulose so that the net result is a greater plasticity in the final molding compound.

Upon acidification the resinous and other substances which are to form the binding constituent of the molding compound are precipitated on and around and intimately mixed with the fibres. The alkali salt formed, together with certain other soluble constituents, are removed by washing. The material is air-dried at a moderate temperature to avoid premature setting. This material now contains in addition to the fibre a number of highly complex organic compounds which are believed to be largely acid in nature. If the material in this condition is subjected to heat and pressure it partially decomposes with the evolution of large quantities of gas and does not set or become rigid in any reasonable time, at least up to one hour. However by the addition of an alkaline substance, such as hydrated lime, before molding, a compound is secured which when pressed at a temperature of 150° C. to 175° C. does not evolve gas and becomes sufficiently rigid to be removed from the mold while hot without distortion in 5 to 10 minutes. The amount of alkali to be used for best results varies with the raw material used, whether sawdust, bagasse or cornstalks, etc. and the treatment which it has received. Thus in some cases 5 to 10% of hydrated lime is sufficient while in others as much as 40% has been used with good results. Under some conditions even greater proportions of lime may be used with advantage.

The substance may be molded into various desired forms and the color can be varied by the addition of suitable dyes or pigments before molding. Various fillers or strengthening agents may likewise be added before molding. The molding powder may be mixed before molding with synthetic resins, such as those of the phenolformaldehyde type and other well known types which become hard and infusible under heat and pressure, and then molded.

What I claim as new and desire to secure by Letters Patent of the United States, is:

1. A process for making a molded product which comprises digesting cellulosic material with an alkali, adding an acid to the digested mass to precipitate on and around the fibres of the material certain resinous and resin forming constituents, separating the solid constituents, washing and drying the same, adding an alkaline substance, and molding the mixture under heat and pressure.

2. A process for making a molded product which comprises preparing resinous compounds from waste cellulosic material by treating the latter first with alkali and then with acid, drying the mass so obtained, intimately mixing therewith an alkaline substance and molding under heat and pressure.

3. A process of making a molded product from waste cellulosic material which comprises treating such material to cause the resinous derivatives thereof to be intimately intermingled with the fibres thereof, adding a substance to prevent the evolution of gas in the mold, and molding under heat and pressure.

4. A process of making a molded product from waste cellulosic material which comprises first digesting said material with alkali then acidifying to precipitate certain resinous constituents therefrom on and around the fibres of the material, adding hydrated lime to the mass before molding and molding under heat and pressure.

5. A process for making a molded product which comprises the steps of digesting with caustic soda a cellulosic material having natural substances capable of yielding resinous compounds therein, adding sulfuric acid to the digested mass to precipitate the dissolved resinous constituents therefrom, filtering and washing the mass until it is neutral, drying the same at about 80° C., adding to the dried mass about 5 to 40% by weight of hydrated lime, reducing the entire mass to powdered form, and molding under heat and pressure.

6. The process of forming a comminuted cellulosic material into a molded product, which consists in digesting the cellulosic material to dissolve the binding substances and separate the cellulose fibres from each other and precipitating on and within the mass of fibres resinous and resin-forming substances, removing undesired by-products and molding under heat and pressure.

7. A composition adapted to be transformed into a hard, infusible, molded substance by heat and pressure, comprising a cellulosic material intimately intermingled with resinous compounds, formed from its natural binding constituents which have been concentrated externally upon the fibres thereof, and a basic material chemically combined with said resinous constituents.

8. A molded product comprising a cellulosic material having intimately incorporated therewith resinous compounds formed from the natural constituents thereof which have previously been concentrated externally thereon and molded under heat and pressure in the presence of hydrated lime.

9. A moldable composition adapted to be transformed into a hard, infusible substance by heat and pressure, comprising comminuted cellulosic material, and resinous binding constituents which have been derived therefrom by digestion in the presence of alkali followed by acid treatment, and an intermingling substance adapted to chemically combine with said resinous compounds during molding.

In witness whereof I have hereunto set my hand this 16th day of October, 1929.

FREDERIC H. SMYSER.